(12) United States Patent
Appanna et al.

(10) Patent No.: US 7,506,194 B2
(45) Date of Patent: Mar. 17, 2009

(54) ROUTING SYSTEM AND METHOD FOR TRANSPARENTLY ROCOVERING ROUTING STATES AFTER A FAILOVER OR DURING A SOFTWARE UPGRADE

(75) Inventors: Chandrashekhar Appanna, Cupertino, CA (US); Ruchi Kapoor, Santa Clara, CA (US); Barry Friedman, Sunnyvale, CA (US); Himanshu Shah, Milpitas, CA (US); Gargi Nalawade, Santa Clara, CA (US); Shyam Suri, Fremont, CA (US); John Harper, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 680 days.

(21) Appl. No.: 10/808,040

(22) Filed: Mar. 24, 2004

(65) Prior Publication Data

US 2005/0213498 A1    Sep. 29, 2005

(51) Int. Cl.
*G06F 11/00* (2006.01)
(52) U.S. Cl. ............................................ 714/3; 714/23
(58) Field of Classification Search .................. 714/23, 714/3
See application file for complete search history.

(56) References Cited

U.S. PATENT DOCUMENTS

| | | | |
|---|---|---|---|
| 5,999,525 A | | 12/1999 | Krishnaswamy et al. |
| 6,477,663 B1 * | | 11/2002 | Laranjeira et al. ............. 714/11 |
| 6,622,261 B1 * | | 9/2003 | Laranjeira et al. ............. 714/11 |
| 6,681,232 B1 | | 1/2004 | Sistanizadeh et al. |
| 6,731,625 B1 | | 5/2004 | Eastep et al. |
| 6,910,148 B1 * | | 6/2005 | Ho et al. ........................ 714/4 |
| 7,003,692 B1 * | | 2/2006 | Banks et al. ................. 370/401 |
| 2003/0140155 A1 | | 7/2003 | Harvey et al. |
| 2003/0140166 A1 | | 7/2003 | Harvey et al. |
| 2003/0140167 A1 * | | 7/2003 | Harvey et al. ............... 709/238 |
| 2004/0001485 A1 * | | 1/2004 | Frick et al. ................... 370/389 |
| 2005/0083953 A1 * | | 4/2005 | May ........................... 370/401 |
| 2005/0135233 A1 * | | 6/2005 | May ........................... 370/216 |
| 2006/0171404 A1 * | | 8/2006 | Nalawade et al. ........... 370/216 |

OTHER PUBLICATIONS

Ian Cowburn et al., "Toward a Hitless Network: BGP Graceful Restart", #134 Technology White Paper, Riverstone Networks, Inc., 2002, pp. 1-4.
Ville Hallivuori, "A Concept for Protecting Stateful Routing Protocols", Helsinki University of Technology, Master's Thesis, Sep. 10, 2001, pp. 1-96.

* cited by examiner

*Primary Examiner*—Scott T. Baderman
*Assistant Examiner*—Paul F. Contino
(74) *Attorney, Agent, or Firm*—Aka Chan LLP

(57) ABSTRACT

Methods and apparatus for efficiently enabling routing states to be recovered after a failover or during a software upgrade in a system which supports graceful restart and stateful switchover are disclosed. According to one aspect of the present invention, a method for restarting a network device which has a plurality of routers and is in communication with a first peer being arranged to support graceful restart and a second peer includes performing a graceful restart with respect to the first peer. A peer transparent failover is performed with respect to the second peer. The graceful restart and the peer transparent failover are performed in response to a failure associated with the network device.

14 Claims, 7 Drawing Sheets

ROUTING SYSTEM AND METHOD FOR TRANSPARENTLY ROCOVERING ROUTING STATES AFTER A FAILOVER OR DURING A SOFTWARE UPGRADE

BACKGROUND OF THE INVENTION

1. Field of Invention

The present invention relates generally to network systems. More particularly, the present invention relates to enabling routers which do not support graceful restart to substantially transparently have their associated states recovered on a router which is being restarted and also performs graceful restart.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

As the demand for data communication services grows, the use of high availability networks is increasing. To this end, many networks are being built such that the components of the networks, e.g., routers, may continue to provide service even when the components must be reset or restarted. A component may generally be restarted when it has suffered a failure, e.g., a control module failure, or when a software upgrade is in process. In some cases, a graceful restart may be used to restart a component substantially while enabling the component to continue to function.

Networks generally include a plurality of components or peers which are in communication. FIG. 1 is a diagrammatic representation of a network. A network 100 includes peers 104, e.g., routers or hosts, which are in communication across connections 108 using a Border Gateway Protocol (BGP) over a Transmission Control Protocol (TCP). Typically, sessions may be established using connections 108 such that one peer 104 may exchange routing information packets with another peer 104, e.g., peer 104a may establish a session with peer 104b. When peer 104a suffers a failure, connections 108a, 108c, 108d effectively go down, and peers 104b, 104d, 104e may no longer completely trust information that was received from peer 104a.

When all peers 104 support a BGP Graceful Restart, a graceful restart may be accomplished to enable traffic to continue to be routed through peer 104a even when peer 104a has suffered a BGP failure and is in the process of restarting. As will be appreciated by those skilled in the art, a graceful restart enables data-forwarding to continue such that packets may be processed and forwarded through peer 104a when BGP on peer 104a is being restarted, i.e., even when a portion of peer 104a which is responsible for identifying best paths has failed. By way of example, when peer 104a fails, graceful restart enables peers 104b, 104d, 104e to wait for peer 104a to come back online, since although peer 104a has gone down, after a certain amount of time, peer 104a will be back online. Peer 104a effectively requests that peers 104b, 104d, 104e not remove any information from peer 104a.

During a graceful restart, a restarting peer, e.g., peer 104a, may set a restart bit to indicate that it has restarted, and may set a forwarding state bit to indicate that it has preserved or otherwise maintain its forwarding state. The preservation of the forwarding state allows peer 104a to restart while peers 104b, 104d, 104e may maintain their routes through peer 104a. In other words, a graceful restart is a substantially transparent process that allows peers 104b, 104d, 104e to effectively hide the restart of peer 104a from the rest of network 100 in terms of packet forwarding only.

As previously mentioned, peers 104 may be routers. With reference to FIG. 2, the configuration of routers will be described. A first router 202 may be in communication with a second router 206 over an interface 210, e.g., a connection. Router 202 has an active route processor 214, and a standby route processor 218. Active route processor 214, or an active route switch processor, controls and runs routing protocols. Standby route processor 218, or a standby route switch processor, is arranged to take over the functions of active route processor 214 when active route processor 214 experiences downtime.

Both active route processor 214 and standby route processor 218 include a BGP speaker 222 and a TCP speaker 226, as will be appreciated by those skilled in the art. Active route processor 214 and standby route processor 218 are substantially connected to linecards 232 through a bus 230. Linecards 232 are arranged to allow interfaces such as interface 210 to enable communication between router 202 and other routers, as for example router 206, which may include the same internal components as router 202, as shown.

As will be understood by those skilled in the art, while the above description of a typical router 202 mentions a separate active route processor and a standby route processor, router 202 may instead include an active stack of BGP and TCP, and a standby stack of TCP and BGP on the same physical route processor.

If router 202 needs to be restarted and both routers 202, 206 have the capability to support a graceful restart, then a graceful restart may occur such that packet forwarding between router 202 and router 206 may essentially remain unaffected while the graceful restart occurs. During a graceful restart of router 202, router 202 will inform router 206 to wait for a certain period of time before removing its associated routes from router 202 and allowing packet forwarding to continue. If router 202 comes back on line within the certain period of time and if a route associated with router 206 is received again, then forwarding for that associated prefix is effectively unaffected.

In order for both router 202 and router 206 to support a graceful restart, both router 202 and router 206 must support the protocol extensions required by a graceful restart. That is, both router 202 and router 206 must both be upgraded to have the software that supports a graceful restart. When router 202 and router 206 are both owned by a common service provider, then ensuring that the relevant software is of the same version on both routers 202, 206 may be relatively easy. Even in such a case, an upgrade may occur at different times. However, when router 202 is owned by a service provider and router 206 is owned by a customer, for instance, it may be difficult to ensure that both routers 202, 206 have the relevant version of the software. In some situations, the relevant software in router 206 may not be upgradeable in the same time frame as the relevant software in router 202. Further, in other situations, it may not be possible to upgrade the relevant software in router 206. There may also be situations where a service provider does not wish to provide any information about internal failures at all.

Some networks use a full stateful switchover solution in which all TCP and BGP states are substantially synchronized on an active route processor and a standby route processor of a router at all times. Stateful switchover generally allows for a standby route processor to take control of a failed active route processor while maintaining connections which were established by the active route processor, and is one example of a failover method. A failover is generally an operational mode in which the functions of a component are assumed by standby subcomponents when active subcomponents become unavailable. Typically, maintaining the connections established by an active route processor is achieved at least in part by checkpointing data needed to maintain connections and functionality from the active route processor to the standby route processor. Although the use of a stateful switchover solution with all peers or routers associated with a router which has suffered a failure may be useful when graceful restart is not supported by all peers associated with the failed router, such a solution is not very scalable, and the cost and performance characteristics associated with the solution are often unacceptable.

Therefore, what is needed is a method and an apparatus which allows a failed router to efficiently maintain its functionality during a restart within a network when not all peers associated with the failed router support graceful restart. That is, what is desired is a system which allows for a failover to occur with a relatively high level of performance within a network that includes peers which do not necessarily support graceful restart.

SUMMARY OF THE INVENTION

The present invention relates to a system for efficiently enabling routing states to be recovered after a failover or during a software upgrade in a system which supports graceful restart and stateful switchover. According to one aspect of the present invention, a method for restarting a network device which has a plurality of routers and is in communication with a first peer being arranged to support graceful restart and a second peer includes performing a graceful restart with respect to the first peer. A peer transparent failover is performed with respect to the second peer. The graceful restart and the peer transparent failover are performed in response to a failure associated with the network device. In one embodiment, when a first route processor boots up, the method also includes identifying a session between the network device and the second peer as a transparent failover session.

Typically, efficient routing system failover processes require that participating peers in a network have the same software capabilities, i.e, a version of software which supports graceful restart. Since service providers generally do not have control over customer networks, service providers may not synchronize software upgrades or force software upgrades. By allowing graceful restart to be performed with respect to peers which are substantially controlled by a service provider and by allowing other transparent failover processes, e.g., a stateful switchover, to be performed with respect to peers which are not controlled by the service provider, failover processes may be relatively efficiently executed.

According to another aspect of the present invention, recovering a routing state associated with a network device when the network device is reset includes performing a graceful restart with respect to a first peer and performing a transparent failover with respect to a second peer. The peer transparent failover includes processing an event queue maintained on a standby route processor of the plurality of route processors to substantially recreate the routing state. Both the graceful restart and the peer transparent failover are performed when connections associated with the network device are reset.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Many networks include peers which either do not support graceful restart or do not have a current software version that supports graceful restart. As a result, it may not be possible to perform a graceful restart with respect to substantially all peers associated with a router which has to be restarted or is undergoing a connection reset. When a network includes both peers which support graceful restart and peers which do not support graceful restart, a full stateful switchover solution may be used when an associated router needs to be restarted. The use of a full stateful switchover solution is generally not a viable option as the performance of a full stateful switchover solution is generally poor.

Within a network, by allowing peers which support graceful restart to be restarted using graceful restart based failover and by allowing peers which do not support graceful restart to undergo a transparent failover such as a stateful switchover, the benefits of graceful restart are available to graceful restart peers while other peers may use stateful switchover. Typically, graceful restart may be used for core side peers while customer side peers use stateful switchover. A system which allows for graceful restart based failovers for core side peers and stateful switchover based failovers for customer side peers substantially eliminates the need for service providers to upgrade customer side peers to run the same version of software which supports graceful restart as used on the core side peers. As a result, the benefits of graceful restart may be experienced by peers which support graceful restart even when customer side peers undergo stateful switchover.

Figure 1:
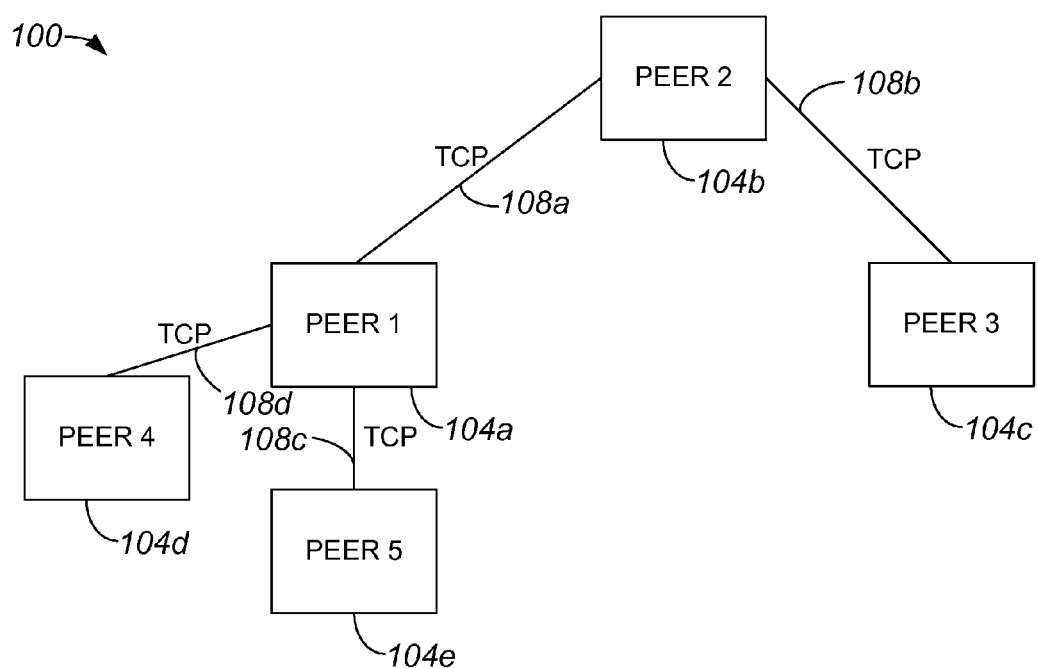
FIG. 1 is a diagrammatic representation of a network.
Figure 2:
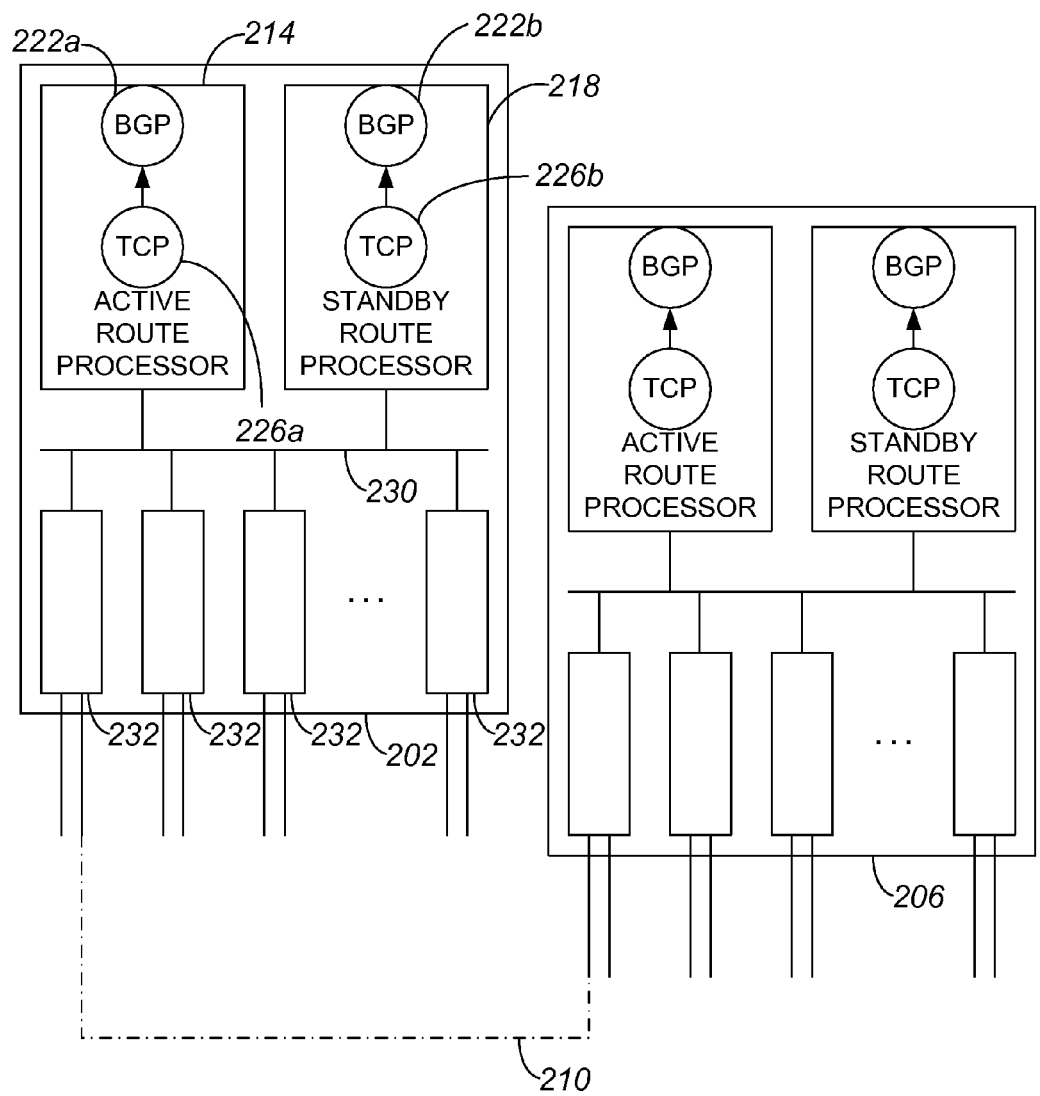
FIG. 2 is a diagrammatic representation of a plurality of routers.
Figure 3:
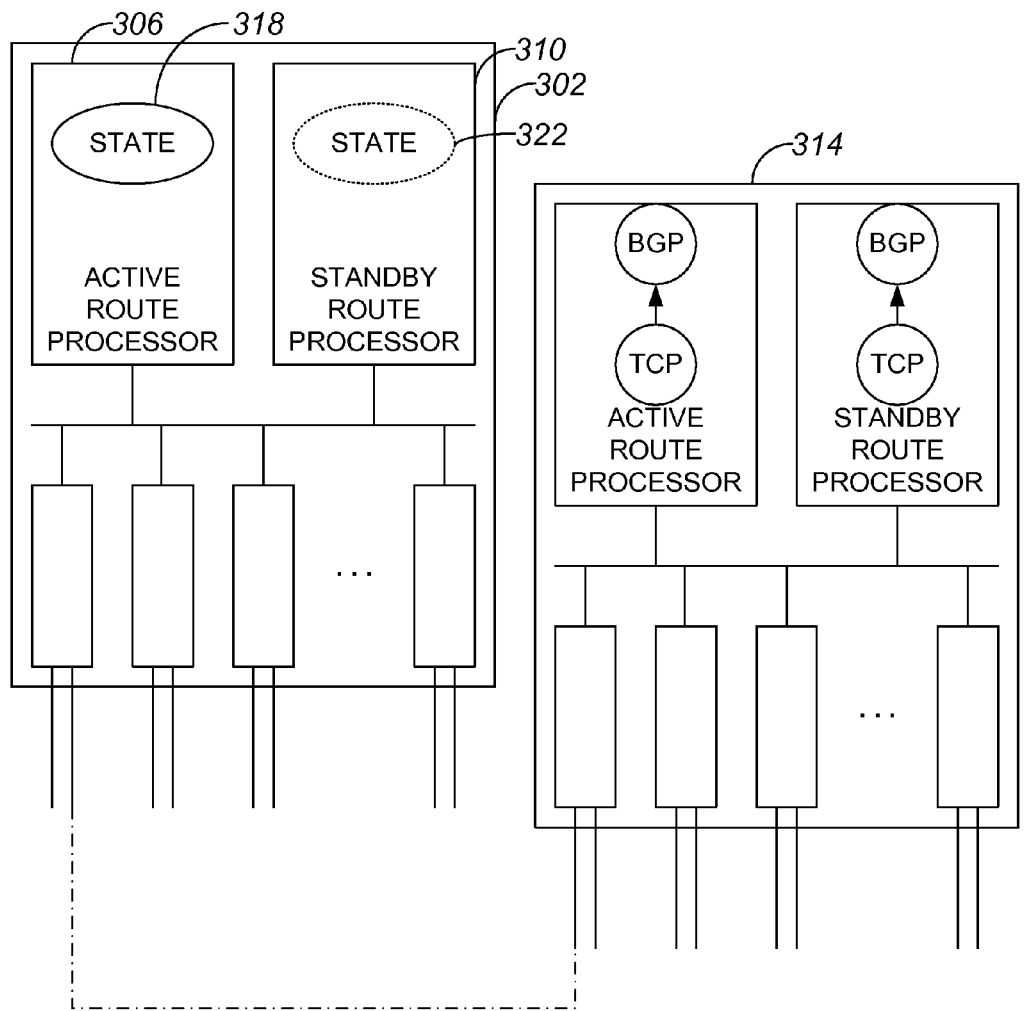
FIG. 3 is a diagrammatic representation of a router which is arranged to support both graceful restart and stateful switchover in accordance with an embodiment of the present invention.

FIG. 3 is a diagrammatic representation of a router which is arranged to support both graceful restart and stateful switchover. When an active route processor 306 of a router 302 boots up, a Border Gateway Protocol (BGP) generally marks sessions associated with peers, as for example peer 314, that support stateful switchover. In one embodiment, marking such sessions generally entails marking substantially all sessions with peers that are not currently arranged to support graceful restart as "stateful switchover" or "peer transparent restart" sessions. For all sessions associated with router 302 that are not marked as stateful switchover sessions, the BGP will typically negotiate graceful restart extensions and provide support for a graceful restart based high availability solution.

For stateful switchover sessions, when a standby route processor 310 effectively boots up, and a transmission control protocol (TCP) has created states 322 which correspond to the stateful switchover sessions on active route processor 306, TCP informs BGP to initialize session states 322 on standby route processor 310. In one embodiment, BGP will substantially only create a minimum set of states 322 on standby route processor 310, and treat the stateful switchover sessions as "receive-only" sessions.

The BGP on active route processor 306 of peer 302 will generally receive BGP messages from peer 314 and process the BGP messages. By way of example, the BGP on active route processor 306 may receive an open message from peer 314, and proceed to parse through the open message. The BGP on standby processor 310 will also receive the open message, but will typically not send any message out to peer 314.

Figure 4:
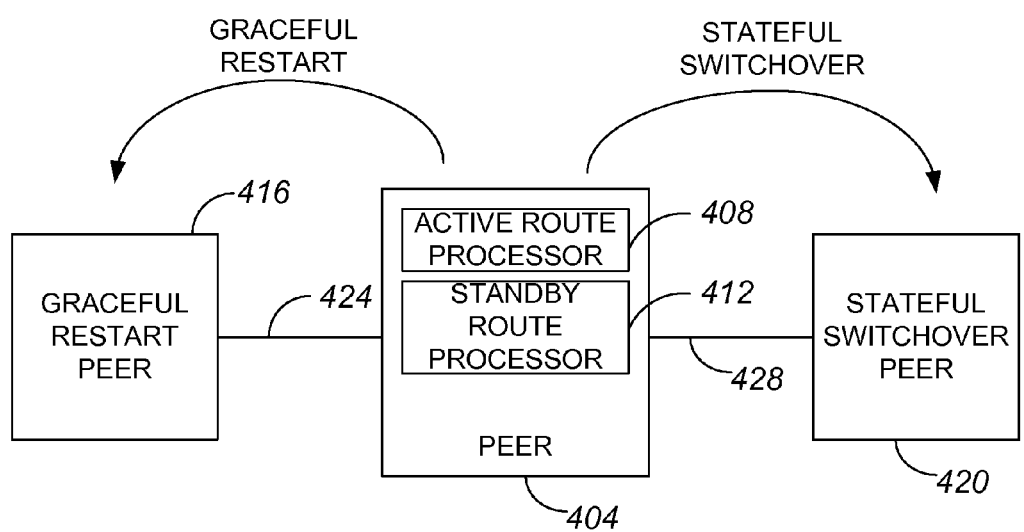
FIG. 4 is a diagrammatic representation of a router which is arranged to perform both graceful restart and stateful switchover in accordance with an embodiment of the present invention.

With reference to FIG. 4, a router which is arranged to effectively perform both graceful restarts and stateful switchovers will be described in accordance with an embodiment of the present invention. A router 404 which includes an active route processor 408 and a standby route processor 412 is in communication with a graceful restart peer 416, or a peer which supports graceful restart, and a stateful switchover peer 420, or a peer which does not support graceful restart. Communication between router 404 and graceful restart peer 416 may be supported by a link 424, while communication between router 404 and stateful switchover peer 420 may be supported by a link 428. Graceful restart peer 416, in one embodiment, may be a core side peer while stateful switchover peer 420 is typically a customer side peer, e.g., a customer side BGP peer.

When router 404 fails or otherwise needs to be restarted, as for example due to a software upgrade, sessions between graceful restart peer 416 and router 404 may be reestablished using a graceful restart. Sessions between stateful switchover peer 420 and router 404 may effectively be sustained using a stateful switchover process that enables a set of states, e.g., routing states, to be substantially recovered. A stateful switchover process may include resending state updates from standby route processor 412 to stateful switchover peer 420. Active route processor 408 may update standby route processor 412 with connectivity and management information which enables standby route processor 412 to take over the functions of active route processor 408 when active route processor 408 fails. Once the failed route processor reboots, i.e., once active route processor 408 reboots, the failed route processor becomes the new standby route processor while original standby route processor 412 becomes the new active route processor. A synchronization process may then occur in which the new active route processor synchronizes information with the new standby route processor.

In general, router 404 is arranged to perform a graceful restart with respect to graceful restart peer 416, and to perform a stateful switchover process with stateful switchover peer 420. It should be appreciated that stateful switchover peer 420 is generally any peer which either does not support graceful restart, or is configured to disable graceful restart. BGP creates, e.g., duplicates or mirrors, a substantially minimum number of states associated with a sessions between router 404 and stateful switchover peer 420 on standby route processor 412. The duplicate or mirrored states, e.g., routing states, may be used to reestablish sessions between router 404 and stateful switchover peer 420 when a stateful switchover process is used in response to a failover.

Figure 5:
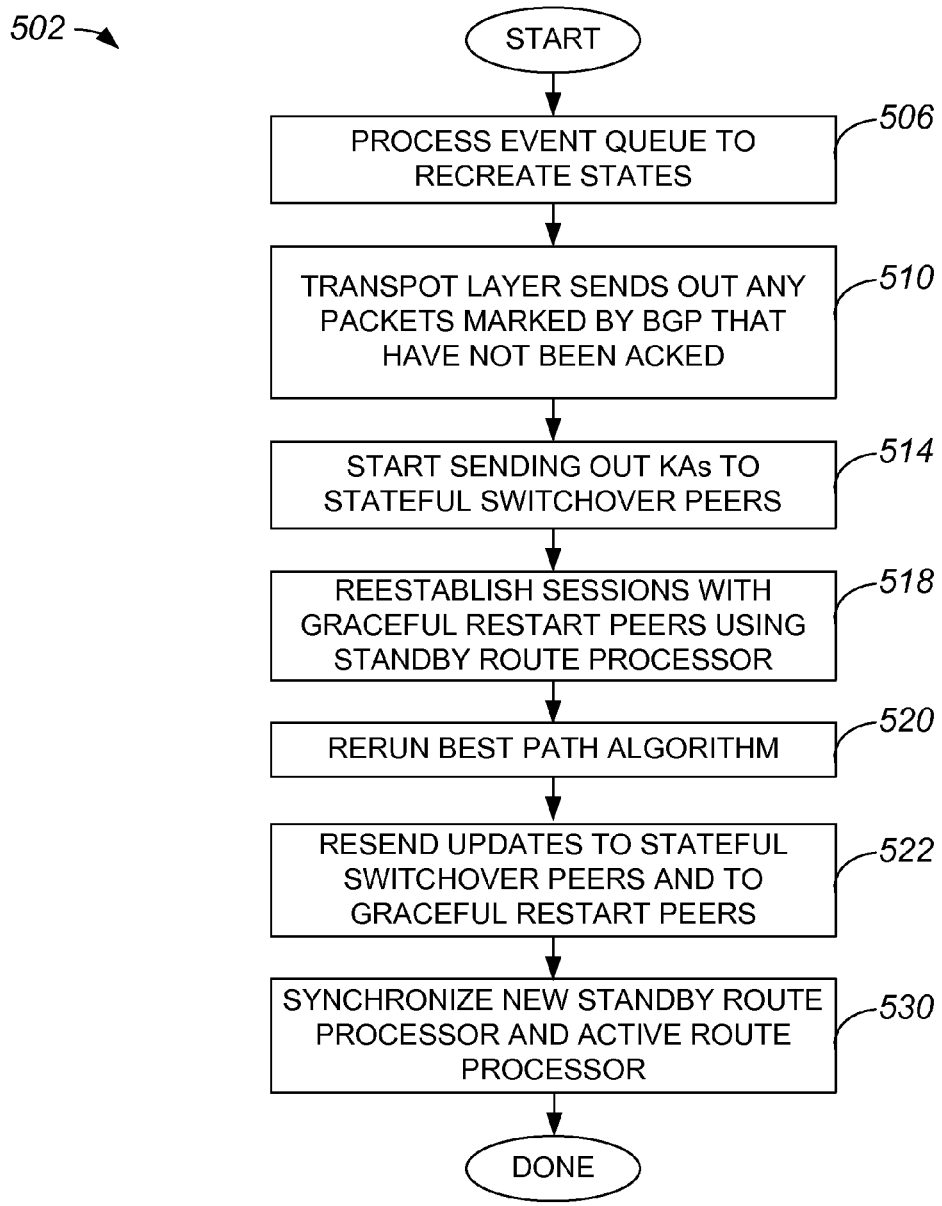
FIG. 5 is a process flow diagram which illustrates the steps associated with one method for effectively restarting a router once a failure has occurred in accordance with an embodiment of the present invention.

The steps associated with responding to a failure, or a planned downtime, may be widely varied. FIG. 5 is a process flow diagram which illustrates the steps associated with one method for effectively restarting a router once a failure has occurred in accordance with an embodiment of the present invention. In other words, FIG. 5 is a process flow diagram which illustrates the steps associated with a failover process that uses both graceful restart and a transparent failover such as a stateful switchover. A process 502 of responding to a failure begins at step 506 in which an event queue is processed to recreate states. The event queue is maintained on a standby route processor of the router on which the failure has occurred, and is used to recreate states associated with an active route processor when the states on the active route processor are no longer available.

In one embodiment, the event queue is maintained on a standby route processor and substantially continuously receives events from an active route processor. The events are used to recreate states associated with the active route processor When a switchover occurs, the standby route processor takes over and first processes substantially all events in the event queue to bring the standby route processor up to speed, i.e., to synchronize the standby route processor, with the state of the active route processor before a failure occurred.

After the event queue is processed, a transport layer (TCP) sends out packets marked by BGP that have not been acked in step 510. In other words, the transport layer will send out outstanding packets that need to be sent out. As will be appreciated by those skilled in the art, outstanding packets are packets or data in a transport window that had to be checkpointed because BGP marked a BGP protocol data link as one that needed to be checkpointed.

Once the transport layer sends out packets marked by BGP that have not been acked, Keep Alive packets (Kas) are sent to stateful switchover peers in step 514. In step 518, sessions with graceful restart peers are reestablished using the standby route processor. The steps associated with reestablishing sessions with graceful restart peers are generally well known to those skilled in the art.

Upon reestablishing sessions with graceful restart peers and effectively receiving data from the graceful restart peers according to graceful restart procedures, the router reruns a best path algorithm to find the best path among the paths available with BGP in step 520. Then, in step 522, updates are resent to stateful switchover peers as well as graceful restart peers. The updates may include updates associated with new best paths through the network, as determined in step 520.

A "sent prefix" database is run through in step 522, and withdraws are sent out to stateful switchover peers if required. The "sent prefix" database, which is maintained on the standby route processor and contains prefixes associated with update packets which have been sent by the active router, is checked to identify substantially any missing prefixes, i.e., prefixes for which updates have not been sent after the switchover. If it is determined that a particular prefix is missing, the indication is that a particular update packet has not been successfully sent before the switchover. As such, a withdraw is sent by the standby route processor.

After the "sent prefix" database is run through, the standby route processor and the active route processor are synchronized in step 530. Synchronizing the route processors includes effectively rendering the current standby route processor to be the new active route processor, while rendering the current active route processor to be the new standby route processor. The steps associated with one method of synchronizing the route processors will be discussed below with respect to FIG. 6. After the current standby route processor and the current active route processor are synchronized, the process of responding to a failure or a downtime is completed.

Figure 6:
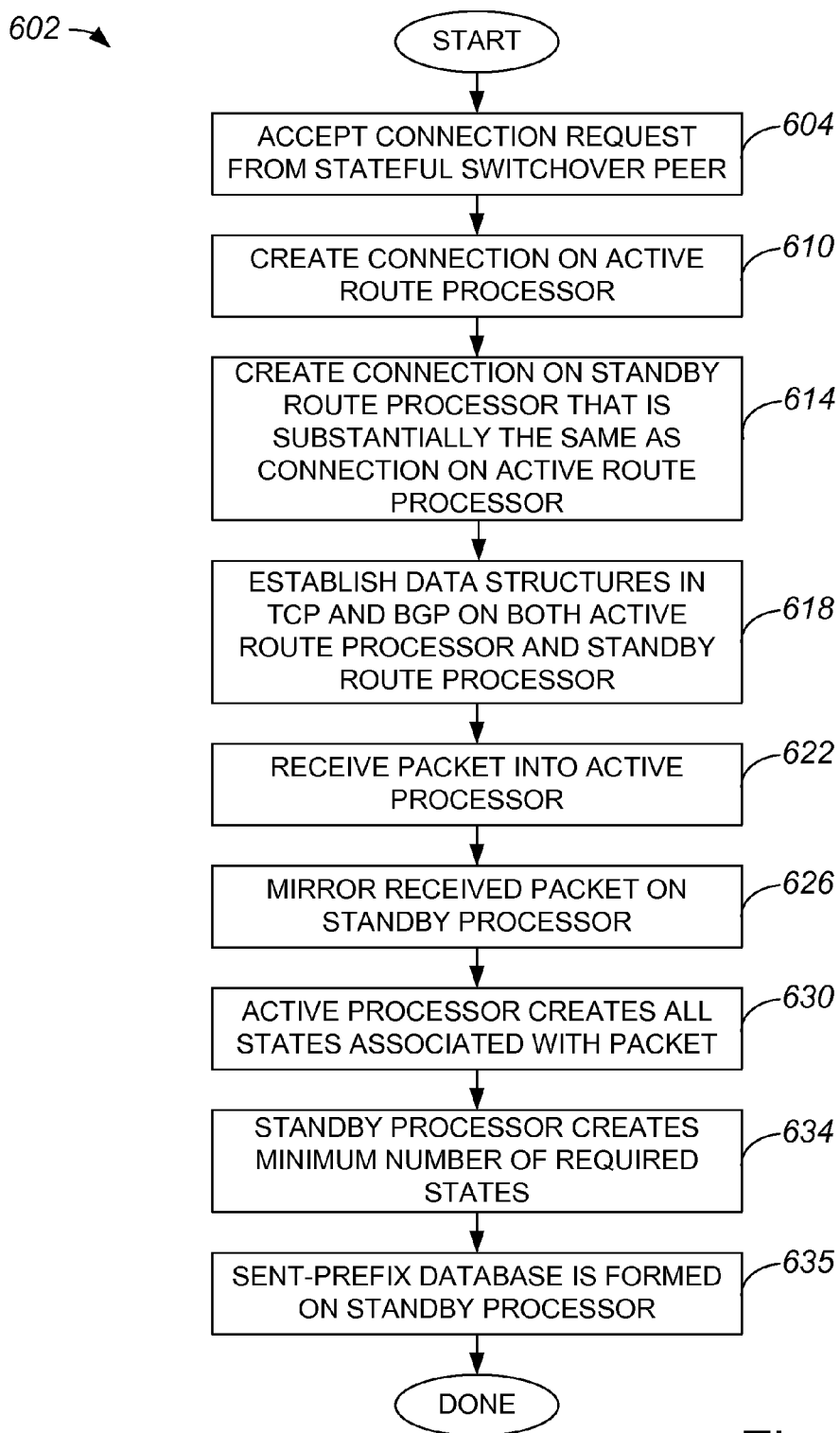
FIG. 6 is a process flow diagram which illustrates the steps associated with one method of synchronizing route processors in a router in accordance with an embodiment of the present invention

FIG. 6 is a process flow diagram which illustrates the steps associated with one method of synchronizing route processors in a router when a standby route processor effectively "comes up" or is otherwise activated as a new active route processor in accordance with an embodiment of the present invention. A process 602 of synchronizing route processors on a router begins at step 604 in which a connection request is accepted from a stateful switchover peer. Once the connection request is accepted, a corresponding connection is created on the active route processor, i.e., the new active route processor, in step 608. Then, in step 610, a connection is created on the standby route processor. In general, the connection that is created on the standby route processor is substantially the same as the connection created on the active route processor.

After the connection is created on the standby route processor, data structures in TCP and BGP are established on both the active route processor and the standby route processor in step 618. Upon establishing the appropriate data structures, a packet is received into the active route processor in step 622, and the received packet is mirrored on the standby route processor in step 626. Once the received packet is mirrored on the standby route processor, then in step 630, the active route processor creates substantially all states associated with the packet. The standby route processor then creates a substantially minimum number of required states in step 634. The states created by the standby route processor are generally a subset of the states created by the active route processor. Upon processing protocol updates received from peers, the active route processor may generate updates to be sent out to stateful switchover peers. Before sending out the updates the active route processor will generally checkpoint prefixes that are part of such updates, to form the sent-prefix database on the standby, in step 635. In the event that a failure of the active route processor occurs, the presence of a substantially minimum number of required states enables the standby route processor to be used in lieu of the active route processor to maintain connections. Once the substantially minimum number of required states is created on the standby route processor and the sent-prefix database on the standby is formed, the process of synchronizing is completed.

Figure 7:
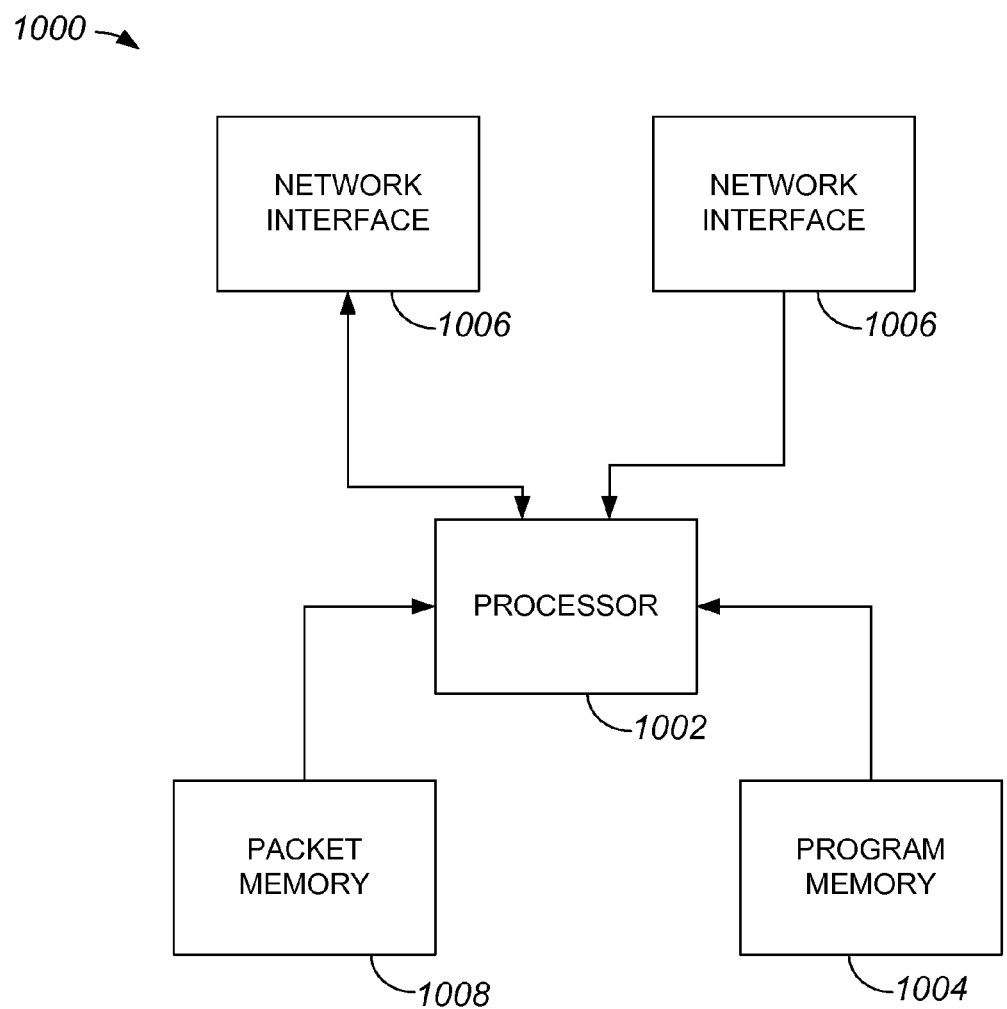
FIG. 7 is a diagrammatic representation of a network device suitable for implementing one embodiment of the present invention.

FIG. 7 depicts a network device that is suitable for use in accordance with an embodiment of the present invention. In one embodiment, a network device 1000 is a programmable machine that may be implemented in hardware, software or any combination thereof. A processor 1002 executes code stored in a program memory 1004. Program memory 1004 is one example of a computer-readable storage medium. Program memory 1004 may be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 1000 includes a packet memory 1008, and interfaces with physical media via a plurality of network interfaces 1006. For example, one of network interfaces 1006 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed, and forwarded by network device 1000, they may be stored in a packet memory 1008. Network device 1000 implements all of the network protocols and extensions thereof described above as well as the features provided by the present invention.

Although only a few embodiments of the present invention have been described, it should be understood that the present invention may be embodied in many other specific forms without departing from the spirit or the scope of the present invention. By way of example, while stateful switchover has been described as being used when a session is associated with a peer which does not support graceful restart, stateful switchover may generally be implemented with respect to substantially any suitable peer. Such peers may includes peers which support graceful restart, i.e., stateful switchover may be used with a peer which supports graceful restart.

Stateful switchover is one example of a peer transparent failover which may be used to enable a router to reestablish sessions with a peer which does not support graceful restart. It should be appreciated that in lieu of stateful switchover, substantially any suitable peer transparent failover may be used to reestablish sessions with a peer when a router that is in communication with the peer needs to be restarted.

While a router may include a separate active route processor and a standby route processor, a router may not necessarily include separate active route and standby route processors. For example, a router may instead include an active stack of BGP and TCP, and a standby stack of TCP and BGP on the same physical route processor.

Generally, the steps associated with the various methods and processes of the present invention may vary widely. Steps may be altered, reordered, removed, and added without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for restarting a network device, the network device having a plurality of route processors, the network device being arranged to be in communication with a plurality of peers within a network, the plurality of peers including a first peer and a second peer, the first peer being arranged to support graceful restart, the method comprising:

performing a graceful restart with respect to the first peer;
performing a peer transparent failover with respect to the second peer, including:
processing an event queue associated with a standby route processor of the plurality of route processors to recreate at least one state associated with a session between the network device and the second peer on the standby route processor;
identifying at least one send packet that is to be sent on the standby route processor; and
sending out a dummy packet to the second peer using the standby route processor to substantially fill in for the at least one send packet;
wherein the graceful restart and the peer transparent failover are performed in response to downtime associated with the network device.

2. The method of claim 1 wherein performing the peer transparent failover further includes:

executing an algorithm, the algorithm being arranged to identify a path through the network; and
sending at least one update to the second peer using the path.

3. The method of claim 2 wherein performing the peer transparent failover further includes:
- identifying a withdraw using a database associated with the standby route processor; and
- sending the withdraw when the withdraw is identified.

4. The method of claim 3 wherein performing the peer transparent failover further includes:
- substantially synchronizing the standby route processor and an active route processor of the plurality of route processors.

5. The method of claim 4 wherein substantially synchronizing the standby route processor and the active route processor includes:
- identifying the standby route processor as a first route processor;
- identifying the active route processor as a second route processor;
- creating a connection on the first route processor;
- creating a connection on the second route processor that is substantially the same as the connection on the first route processor;
- receiving a packet on the first route processor;
- mirroring the packet on the second route processor;
- creating a set of substantially all states associated with the packet on the first route processor; and
- creating a subset of the set of substantially all states on the second route processor.

6. The method of claim 5 wherein the subset of the set of substantially all states is a substantially minimum number of required states.

7. A device suitable for use in a network, the device being arranged to be in communication with a first peer and a second peer, the first peer being arranged to support graceful restart, the device comprising:
- a plurality of route processors;
- code devices that determine when the device is to be restarted;
- code devices that cause a graceful restart to be performed with respect to the first peer when it is determined that the device is to be restarted;
- code devices that cause a peer transparent failover to be performed with respect to the second peer when it is determined that the device is to be restarted, the code devices including
  - code devices that cause an event queue associated with a standby route processor of the plurality of route processors to be processed to recreate at least one state associated with a session between the device and the second peer on the standby route processor;
  - code devices that cause at least one send packet that is to be sent on the standby route processor to be identified; and
  - code devices that cause a dummy packet to be sent to the second peer using the standby route processor to substantially fill in for the at least one send packet; and
- a medium that stores the code devices.

8. The device of claim 7 wherein the code devices that cause the peer transparent failover to be performed further include:
- code devices that cause an algorithm to be executed, wherein the algorithm is arranged to identify a path through a network that includes the device; and
- code devices that cause at least one update to be sent to the second peer using the path.

9. The device of claim 8 wherein the code devices that cause the peer transparent failover to be performed further include:
- code devices that cause the standby route processor and an active route processor of the plurality of route processors to be substantially synchronized.

10. The device of claim 9 wherein the code devices that cause the standby route processor and the active route processor to be substantially synchronized include:
- code devices that cause the standby route processor to be identified as a first route processor;
- code devices that cause the active route processor to be identified as a second route processor;
- code devices that cause a connection to be created on the first route processor;
- code devices that cause a connection to be created on the second route processor that is substantially the same as the connection on the first route processor;
- code devices that cause a packet to be received on the first route processor;
- code devices that cause the packet to be mirrored on the second route processor;
- code devices that cause a set of substantially all states associated with the packet on the first route processor to be created; and
- code devices that cause a subset of the set of substantially all states to be created on the second route processor.

11. The device of claim 10 wherein the subset of the set of substantially all states is a substantially minimum number of required states.

12. A device suitable for use in a network, the device being arranged to be in communication with a first peer and a second peer, the first peer being arranged to support graceful restart, the device comprising:
- a plurality of route processors;
- means for performing a graceful restart with respect to the first peer; and
- means for performing a peer transparent failover with respect to the second peer, wherein the graceful restart and the peer transparent failover are performed in response to a resetting process associated with the device, the means for performing the peer transparent failover including:
  - means for processing an event queue associated with a standby route processor of the plurality of route processors to recreate at least one state associated with a session between the device and the second peer on the standby route processor;
  - means for identifying at least one send packet that is to be sent on the standby route processor; and
  - means for sending out a dummy packet to the second peer using the standby route processor to substantially fill in for the at least one send packet.

13. The device of claim 12 wherein the means for performing the peer transparent failover further include:
- means for executing an algorithm, the algorithm being arranged to identify a path through the network; and
- means for sending at least one update to the second peer using the path.

14. The device of claim 13 wherein the means for performing the peer transparent failover further include:
- means for substantially synchronizing the standby route processor and an active route processor of the plurality of route processors.

* * * * *

UNITED STATES PATENT AND TRADEMARK OFFICE
CERTIFICATE OF CORRECTION

PATENT NO.         : 7,506,194 B2                                              Page 1 of 1
APPLICATION NO. : 10/808040
DATED              : March 17, 2009
INVENTOR(S)        : Chandrashekhar Appanna et al.

It is certified that error appears in the above-identified patent and that said Letters Patent is hereby corrected as shown below:

On Title page, and Col. 1 line 2 in the Title (54), replace "ROCOVERING" with -- RECOVERING --.

Signed and Sealed this

Twenty-first Day of April, 2009

JOHN DOLL
*Acting Director of the United States Patent and Trademark Office*